United States Patent [19]

Holland

[11] 4,454,458

[45] Jun. 12, 1984

[54] SYNCHRONOUS DRIVE FOR BRUSHLESS DC MOTOR

[75] Inventor: Gary L. Holland, Boise, Id.

[73] Assignee: Hewlett-Packard Company, Palo Alto, Calif.

[21] Appl. No.: 326,631

[22] Filed: Dec. 2, 1981

[51] Int. Cl.³ ............................................. H02K 29/00
[52] U.S. Cl. ................................... 318/254; 318/138; 318/439; 318/685
[58] Field of Search ............... 318/314, 318, 685, 696, 318/702, 715, 254 A, 254, 138, 439

[56] References Cited

U.S. PATENT DOCUMENTS

| | | | |
|---|---|---|---|
| 3,924,721 | 12/1975 | Reynolds | 318/685 |
| 4,072,888 | 2/1978 | Bechtle et al. | 318/685 |
| 4,140,956 | 2/1979 | Pritchard | 318/696 |
| 4,215,302 | 7/1980 | Chiang | 318/696 |
| 4,262,239 | 4/1981 | Kawa | 318/685 |
| 4,270,074 | 5/1981 | Duckworth et al. | 318/254 |
| 4,328,452 | 5/1982 | Ragen et al. | 318/685 |

*Primary Examiner*—David Smith, Jr.
*Attorney, Agent, or Firm*—F. David LaRiviere; Leslie G. Murray

[57] ABSTRACT

Method and apparatus for starting and driving a brushless DC motor and compensating variations in motor speed by producing sequential drive currents through the motor coils, selectively interrupting such currents to allow the rotor to catch up with the rotating stator field during startup, and stabilizing motor speed by controlling motor coil current in inverse proportion to the rate of change of phase lag of the rotor behind the rotating stator field.

6 Claims, 5 Drawing Figures

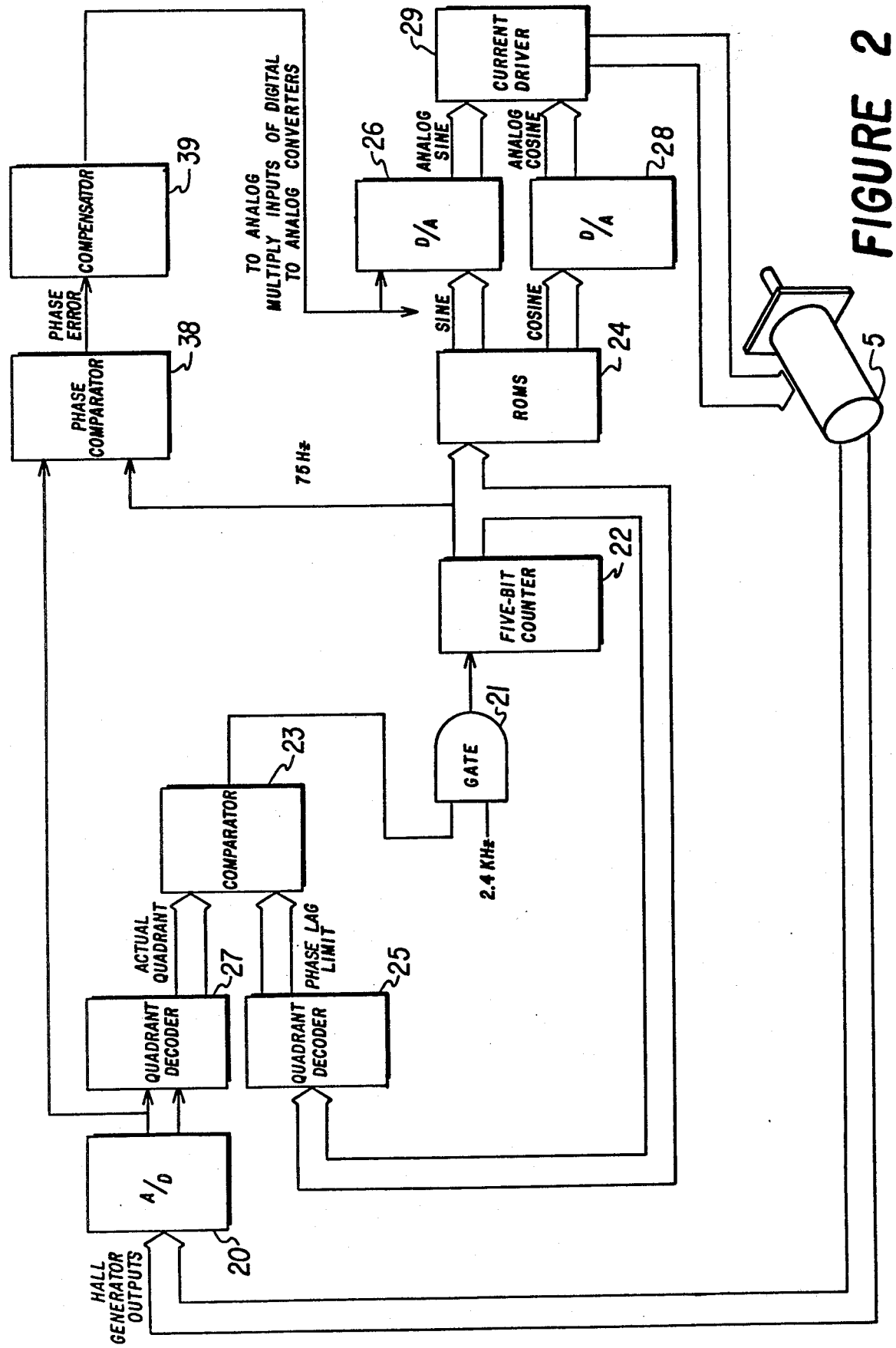

SYNCHRONOUS DRIVE FOR BRUSHLESS DC MOTOR

BACKGROUND AND SUMMARY OF THE INVENTION

The present invention relates to electronic circuitry for driving brushless dc motors. More particularly, driving such motors at a constant rotational velocity. Prior art circuitry generally employ a high resolution optical encoder referenced to the motor shaft. From the output of such an encoder, angular information is obtained which is compared to a stable clock signal by a phase comparator which produces an output signal representing rotor phase angle error. The phase error signal is then used to vary the input voltage or current to the motor coils applied by commutation, thus controlling rotational speed. Such configurations require costly encoders along with complex commutation circuits.

The present invention eliminates the need for a high resolution optical encoder and conventional phase lock loop circuits by employing a simple position detector for the commutation needed to start the motor. The circuit of the present invention provides for starting such a motor, for damping initial low frequency instability of rotational speed, and for maintaining substantially constant rotational speed after attaining desired operational speed. Using the signal outputs from Hall effect generators incorporated into the dc motors employed, the present invention also provides damping of unstable rotational speed of the motor shortly after startup and substantially constant rotational speed during normal operation thereafter.

The rotational speed of a dc motor controlled by the drive circuitry of the present invention is locked to a crystal controlled reference signal. Positional information indicating the quadrant in which the rotor is located is used to start the motor. It is also used to correct for momentary load or other operational perturbations which may cause the rotor to unlock from crystal control.

DESCRIPTION OF THE DRAWING

FIG. 2 is a block diagram of a synchronous drive circuit for a brushless dc motor constructed according to the principles of the present invention.

DESCRIPTION OF THE PREFERRED EMBODIMENT

Figure 1:
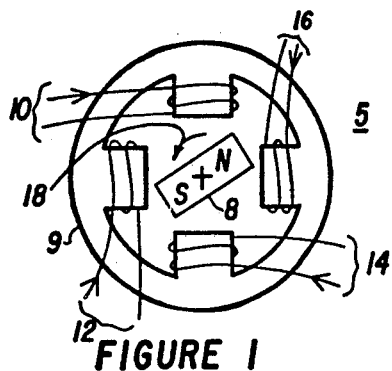
FIG. 1 is a schematic diagram of a brushless dc motor employed with the drive circuit of FIG. 2.

Referring to FIG. 1, brushless dc motor 5 includes permanent magnet rotor 8 and armature 9 which includes electromagnetic coils 10, 12, 14 and 16. By sequentially energizing the coils in order of their reference number, a rotating magnetic field is created in the stator. Under normal operating conditions, the rotor will follow this magnetic field and, depending on speed and time after startup, will lag slightly behind the field.

Two Hall Effect generators (not shown) are an integral part of the motor. Such devices provide sinusoidal output voltages representing the position of the rotor as it turns. The output voltages are phased such that their wave forms are 90 degrees apart.

The synchronous drive circuitry for brushless dc motor 5 in accordance with the principles of the present invention is shown in FIG. 2 and comprises current driver 29 for driving the stator field coils of motor 5 coupled to digital-to-analog (D/A) convertors 26 and 28 which are coupled to read-only-memory (ROM) 24 for receiving sine and cosine signals therefrom. ROM 24 receives signals from counter 22 which is driven at a 2.4 kz rate by a crystal clock gated by gate 21, which is also coupled to comparator 23. Comparator 23 is coupled to quadrant decoders 25 and 27 which produce signals representing the instantaneous position of rotor 8 by quadrant as it follows the rotating stator field. Quadrant decoder 25 receives input from counter 22 and quadrant decoder 27 receives signals from analog-to-digital (A/D) converter 20 produced in response to signals received from Hall Effect generators incorporated into motor 5. D/A converter 26 and 28 are also coupled to compensator 39 for receiving signals inversely proportional to the phase lag of rotor 8 behind stator field rotation produced by phase comparator 38. Phase comparator 38 produces those signals in response to signals received from counter 22 and A/D convertor 20.

Figure 3:
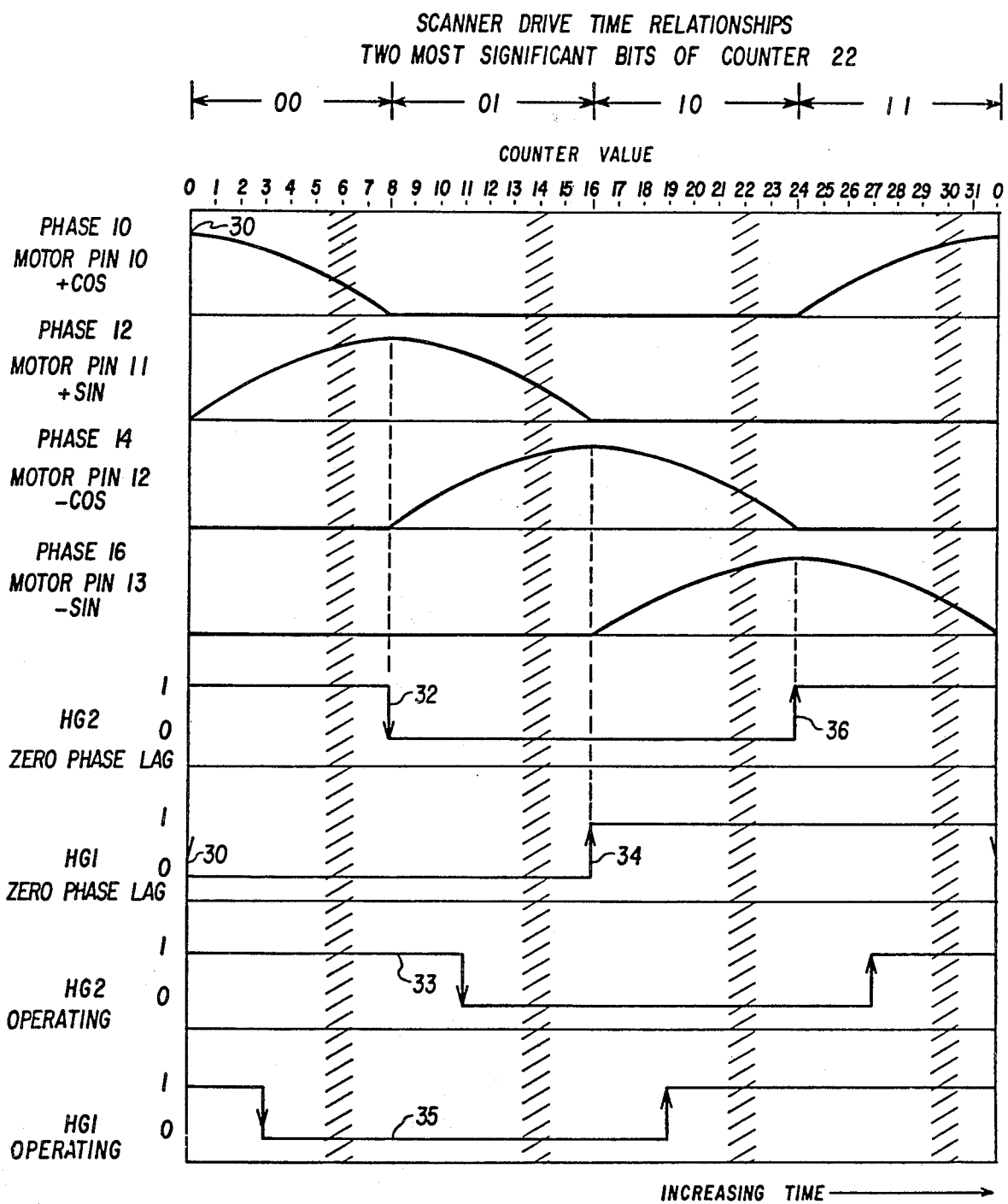
FIG. 3 is a signal timing diagram showing the relationships of the motor drive signals to the position information signals.

Referring now to FIGS. 2 and 3, analog to digital converter 20 produces a signal transition representing a digital "one" whenever the output signal of a Hall Effect generator is in a positive half cycle. Thus, under slowly rotating conditions and zero phase lag is assumed, when one coil at a time is energized, a negative transition on one Hall Effect generator output signal (HG-1) waveform at 30 occurs when coil 10 is energized and a negative transition on the second Hall Effect generator (HG-2) output signal waveform at 32 occurs when coil 12 is energized. Similarly, a positive transition occurs on the HG-1 waveform at 34 when coil 14 is energized and a positive transition occurs on the HG-2 waveform at 36 when coil 16 is energized. The above transition sequence assumes counterclockwise (CCW) rotation of rotor 8 as indicated by arrow 18 in FIG. 1.

As stated above, zero phase lag waveforms can be assumed for slowly rotating conditions. For typical operating conditions, the rotor lags somewhat behind the stator field, as shown by waveforms 33 and 35.

Referring again to FIG. 2, counter 22 determines where, in any given cycle, the energizing current waveforms occur. Thus, energizing current applied to coils 10, 12, 14 and 16 of the motor are always in the same relationship and correspond to counter values shown at the top of FIG. 3. Counter 22 addresses ROM 24 which provide a signal to digital to analog (D/A) converters 26 and 28 which represent the sine and cosine functions respectively for driving the coils. D/A converters 26 and 28 provide analog waveforms to current driver 29, which provides sequential currents to coils 10, 12, 14 and 16 or motor 5.

Counter 22 is clocked at a 2.4 kHz rate via gate 21. The clock rate determines the rate of sine and cosine signals from D/A converters 26 and 28 which cycle at 75 Hz. Current driver 29 rectifies the signals received from D/A converter 28 and provides a current proportional to the resulting cosine wave to coil 10 of motor 5. In similar fashion, coil 12 is energized by a current proportional to the sine wave signal produced by D/A converter 26. Finally, energizing currents for coils 14 and 16 are derived from the inverse of the cosine and sine waves produced by A/D converters 28 and 26, respectively.

The inertia of rotor 8 in motor 5 precludes immediate rotation in response to the rotating magnetic field. Startup is achieved by driving the magnetic field at the desired rotational speed, in this case 75 Hz, but stopping the driving current four times per revolution to allow the rotor to catch up by its magnetic attraction to the stator field.

Referring again to FIG. 3, the four counts of counter 22 at which the stator field driving current is stopped are 6, 14, 22 and 30. Thus, if counter 22 is at count 6 and HG-1 is still a digital "one" output, there is nearly 90 degrees phase lag between the stator field and the rotor 8. In that event, the clock is disabled by gate 21 in response to input from comparator 23 until the HG-1 output falls to "zero", at which time the clock is then enabled again. Similarly, if HG-2 is still a digital "one" when count 14 occurs, the clock pulse is disabled until the HG-2 output again falls to "zero", at which time the clock is enabled. In like manner, if HG-1 output is still "zero" when count 22 appears, the energizing signal is stopped until it becomes a "one" and, if HG-2 output is still "zero" when count 30 occurs, the signal is stopped until it becomes a "one".

Figure 4:
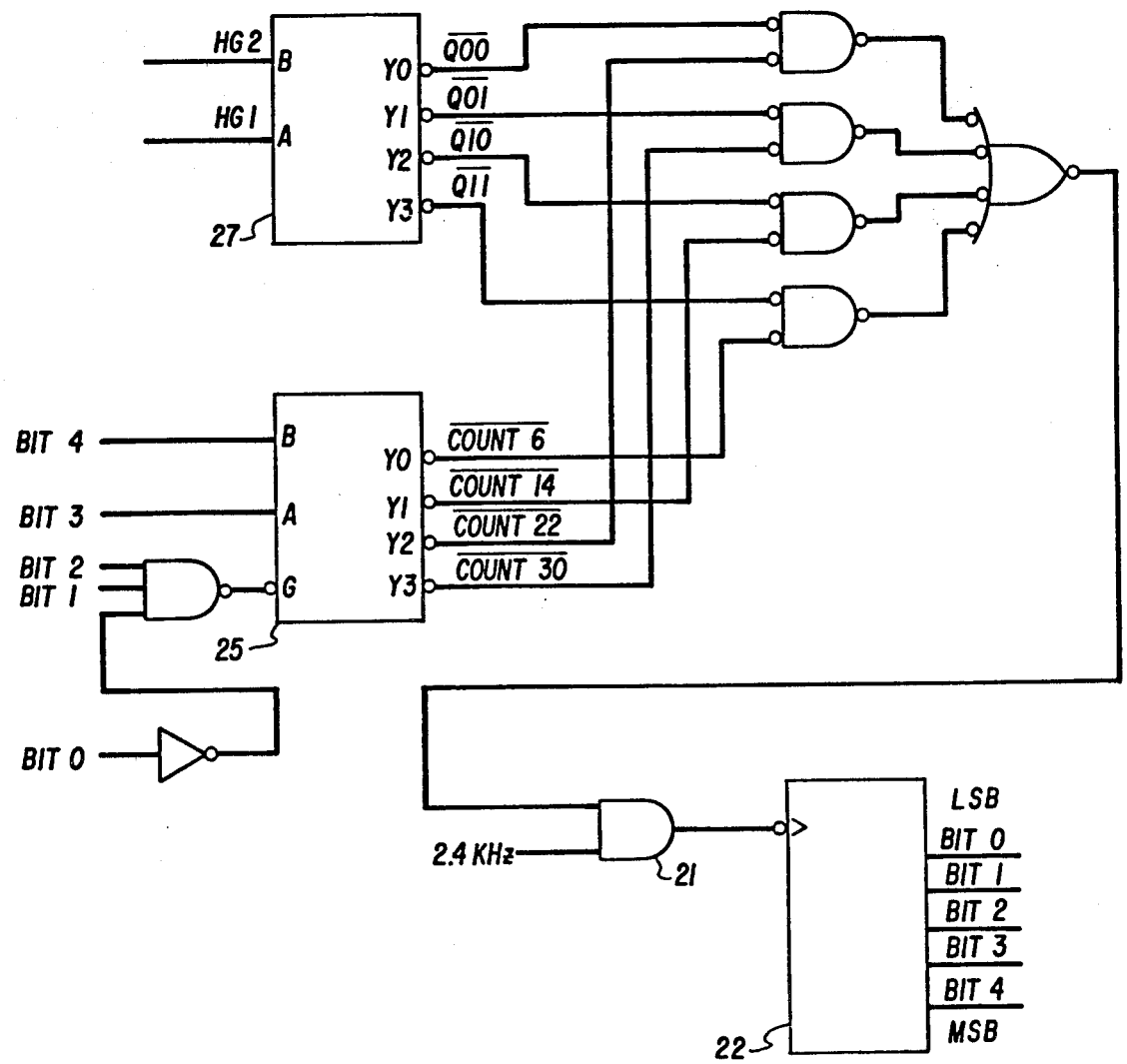
FIG. 4 is a logic diagram of the startup portion of the synchronous drive circuit of FIG. 2.

The quadrant in which rotor 8 is turning at any given time is known by the output signals of Hall Effect generators. For binary encoding purposes, HG-2 may be arbitrarily established as the most significant bit and HG-1 the least significant bit. Therefore, the order of the quadrant through which rotor 8 turns is given by Q10, Q00, Q01 and Q11. Thus, the clock pulse is disabled when count 6 of counter 22 occurs at the same time rotor 8 is in quadrant Q11, or when count 14 occurs concurrent with rotor 8 in Q10. Similarly, the clock pulse is disabled when count 22 of counter 22 is concurrent with rotor 8 rotating in quadrant Q00 or when count 30 is concurrent with rotor 8 turning through quadrant Q01. Thus, quadrant decoders 25 and 27 control the clock pulses via gate 21 and comparator 23 in accordance with these relationships. The logic diagram for a startup circuit constructed according to the principles of the present invention is shown in FIG. 4.

While the circuitry already described is enough to drive motor 5 at a 75 Hz rate, additional circuitry is required to damp transient increases and decreases or surging, of rotational speed of rotor 8 (hereinafter "wobble") which occur shortly after startup of motor 5. Without damping compensation circuitry, wobble may take as long as five minutes to damp out after startup.

Figure 5:
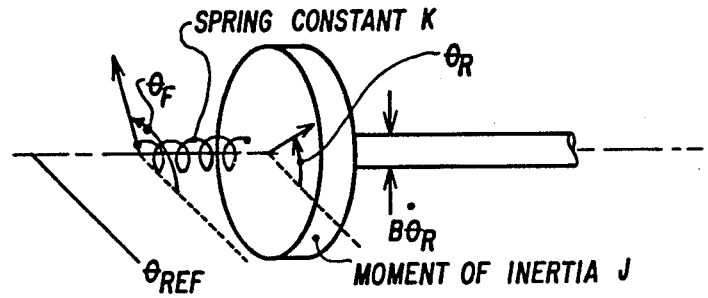
FIG. 5 is a schematic diagram showing a mechanical equivalent of the coupling of the rotor to the rotating stator field of a brushless dc motor.

Wobble may be visualized by analogizing the magnetic coupling between rotor 8 and the rotating stator field to a spring which stretches and contracts during startup as rotor 8 attempts to catch up with the rotating stator field as shown in FIG. 5. Thus, the rotating stator field applies torque to rotor 8. If the torque is proportional to current through the motor coils, by controlling that current using angular position information wobble may be damped in accordance with the relationships given below.

Referring to FIG. 5,
let $\theta_R$ = the angle of rotor 8;
let $\theta_F$ = the angle of the stator field;
let $(B^{d\theta}R)/(dt)$ = friction torque do to shaft bearing;
let J = moment of inertia of rotor 8 and its load; and
let T = torque applied to rotor 8.
Then $$\Sigma T = J \frac{d^2\theta R}{dt^2}$$

$$J \frac{d^2\theta R}{dt^2} + B \frac{d\theta R}{dt} = K(\theta_F - \theta_R),$$

and in La Place Notation, $(S^2J + SB) \theta_R(s) = K (\theta_F(s) - \theta_R(s))$.

The current through the motor coils determines the characteristics of the rotating field. Therefore, the rotating field is controlled by varying that current using angular position information derived from the outputs of the Hall Effect generators, HG-1 and HG-2. The wobble compensation circuitry described above also provides compensation for variations in speed which may occur during normal operation.

The wobble compensation circuitry comprises phase comparator 38 and compensator 39. Phase comparator 38 provides a compensation signal inversely proportional to the phase lag of rotor 8 behind the rotating stator field. That signal is A/C coupled into compensator 39 to provide a signal representing the rate of change of phase lag of rotor 8, and is then conditioned for multiplication with the input signals received by D/A converters 26 and 28. The compensation signal is ultimately used to set the peak value of the current drive signals provided by current driver 29. As the phase lag of rotor 8 varies, the compensation signal acts to keep the lag constant.

I claim:
1. Apparatus for driving an electric motor having a rotor and a plurality of stator coils, at a plurality of predetermined constant speeds, said apparatus comprising:
drive means coupled to said motor for sequentially energizing said stator coils to generate a rotating magnetic field therein at a predetermined rate;
timing means for providing timing signals at a predetermined rate;
storage means coupled to the drive means and to the timing means for storing data representative of current patterns, said storage means responsive to said timing signals to provide signals representative of said current patterns to said drive means for determining the speed at which said motor is driven;
position sensing means coupled to said motor for providing feedback signals representative of the instantaneous position of said rotor when it rotates in response to said rotating magnetic field; and
compensation means coupled to the drive means, to the timing means, and to the position sensing means and responsive to said feedback signals and said timing signals for providing a compensation signal inversely proportional to the rate of change of the phase lag of said rotor with respect to said rotating magnetic field, said drive means responsive to said compensation signal to compensate for transient increases and decreases in rotational speed of rotor during startup and thereafter.

2. Apparatus as in claim 1 further including a comparator means, coupled to timing means and to the position sensing means, responsive to said feedback signals and said timing signals for producing control signals to interrupt the rotating magnetic field at preselected times to permit the rotor to catch up with said rotating magnetic field during startup of said motor.

3. Apparatus as in claim 2 wherein the position sensing means comprises:
   a pair of Hall effect generators for providing sinusoidal voltage signals representative of the instantaneous position of said rotor as it turns, said voltage signals electrically separated by 90 degrees of phase; and
   analog-to-digital converter means responsive to said sinusoidal voltage signals for producing binary coded signals indicative of instantaneous rotor position.

4. Apparatus as in claim 3 wherein the storage means comprises an electronic memory means responsive to said timing signals for storing at addressable locations digital data representative of predetermined current patterns.

5. Apparatus as in claim 4 wherein the electronic memory means comprises a read only memory.

6. Apparatus as in claim 5 wherein said predetermined current patterns stored in said read only memory comprise sine and cosine wave current patterns for driving said plurality of stator coils.

* * * * *